United States Patent [19]

Schmidt

[11] Patent Number: 5,247,407
[45] Date of Patent: Sep. 21, 1993

[54] DISK LOADING SYSTEM

[75] Inventor: Terence J. Schmidt, St. Paul, Minn.

[73] Assignee: Rimage Corporation, Minneapolis, Minn.

[21] Appl. No.: 669,777

[22] Filed: Mar. 15, 1991

[51] Int. Cl.$^5$ .................................................. G11B 17/08
[52] U.S. Cl. .................................................... 360/98.04
[58] Field of Search ............... 360/92, 98.04, 98.06; 414/788.7, 797.9

[56] References Cited

U.S. PATENT DOCUMENTS

| | | | |
|---|---|---|---|
| 4,479,210 | 10/1984 | Nakayama | 360/98.04 |
| 4,693,659 | 9/1987 | Burke et al. | 360/98.04 |
| 4,903,154 | 2/1990 | Costas et al. | 360/98.04 |
| 4,954,918 | 9/1990 | Shiosaki | 360/92 |
| 5,001,582 | 3/1991 | Numasaki | 360/92 |
| 5,056,073 | 10/1991 | Fitzgerald et al. | 360/92 |
| 5,069,597 | 12/1991 | Doctor | 360/98.04 |
| 5,123,000 | 6/1992 | Fitzgerald et al. | 360/92 |
| 5,127,048 | 6/1992 | Press et al. | 360/98.04 |
| 5,128,816 | 7/1992 | Imazaike | 360/92 |

Primary Examiner—A. J. Heinz
Attorney, Agent, or Firm—Palmatier, Sjoquist & Helget

[57] ABSTRACT

A system for transporting diskettes in serial order from a vertical stack of diskettes, including a slidable gate positioned beneath the stack, and a reciprocable carriage connected to the gate and a drive motor for reciprocable motion. The carriage has a flag tab which interrupts electro-optical sensors positioned at spaced intervals along the carriage path of travel, and electro-optical sensors are connected to a control circuit for controllably regulating drive motors. The carriage moves from a home position to a pick position for receiving a diskette from the stack, and then moves to a load position for transferring the diskette into a magnetic drive unit, and subsequently moves to an eject position for ejecting the diskette from the magnetic drive unit, and finally moves to the home position to complete the cycle.

13 Claims, 6 Drawing Sheets

DISK LOADING SYSTEM

BACKGROUND OF THE INVENTION

The present invention relates to systems for recording diskettes, and more particularly to a transport device for controllably feeding diskettes into a recorder or duplicating machine, and for transporting the diskettes away from the machine after the recording process has been completed.

Recording and duplicating equipment is widely used in the manufacture of computer software disks for sale in the software industry. Computer programs which are developed for commercial licensing and distribution are typically packaged in one or more prerecorded disks, and the disks are sold or licensed to the user in conjunction with supporting literature and documentation. The vehicle for packaging such programs is either in the form of a 5¼ inch diameter floppy disk, or a 3½ inch diameter diskette, depending upon the type and brand of the user's computer equipment. The present invention is primarily directed to the duplicating of 3½ inch diskettes, although the principles described herein may be applied to other magnetic or optical recording media.

Commercial demand for popular computer software necessitates the production of literally thousands of copies of the software on prerecorded magnetic diskettes. Each of these magnetic diskettes are individually recorded in a magnetic drive device, and the recorded data is checked and verified as to accuracy and completeness. Machines which accomplish these functions are available to the software developers in the form of diskette duplicators, which are largely automated to provide a large number of prerecorded diskettes in a relatively short period of time. The transport mechanisms which feed unrecorded diskettes into these machines are also highly automated, and are adapted to handle the diskettes at a rate commensurate with the recording rate in the diskette duplicator. Such a transport device has a feeding mechanism which enables the transport to receive a serial stream of unrecorded diskettes, and the transport mechanism inserts each of the received diskettes into the magnetic drive mechanism for recording, and after the recording has been completed the transport receives the ejected and recorded diskette and moves it along a path for further manufacturing operational steps. For each diskette which is handled, the transport device goes through a series of predefined movements and steps, which must be carefully and sequentially arranged so that any failure in the transport operation can be immediately detected to stop the system and permit repair operations to be accomplished.

SUMMARY OF THE INVENTION

The present invention includes a diskette transport housing mounted adjacent a magnetic disk drive device, the transport housing including a diskette transport shelf which is movably positionable adjacent the magnetic drive access opening. The transport housing includes a motor drive assembly which is mechanically coupled to pinch rollers for moving a diskette into and out of the transport housing. A cam follower and lever arm are engageable by the motor drive assembly to assist in the insertion and removal of a diskette from the magnetic drive device, and a plurality of photo cells are placed along the diskette path of travel to monitor diskette position and to control the motor drive assembly.

It is a principal object of the present invention to provide a diskette loading system for inserting diskettes into a magnetic drive device, for ejecting diskettes from the magnetic drive device, and for transporting diskettes away from the magnetic drive device.

It is another object of the present invention to provide a diskette transport system which tracks the movement of diskettes into and out of a disk drive, thereby to detect malfunctions in transport operation.

BRIEF DESCRIPTION OF THE DRAWINGS

The foregoing objects and advantages of the invention will become apparent from the appended specification and claims, and in reference to the drawings, in which:

DESCRIPTION OF THE PREFERRED EMBODIMENT

Figure 1:
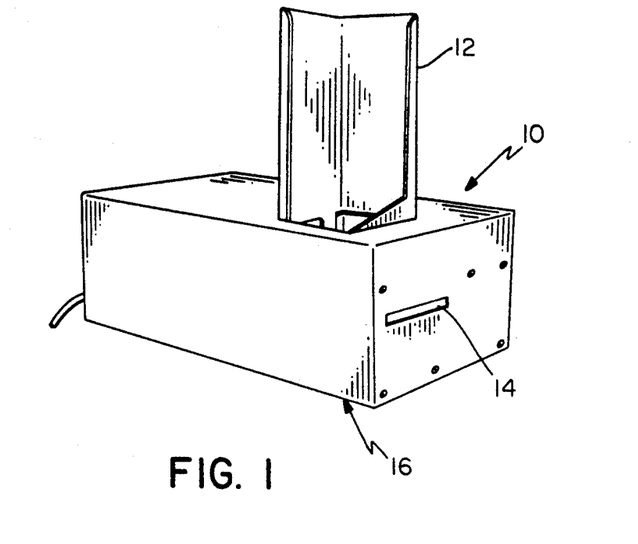
FIG. 1 shows an isometric view of the invention in a cabinet.

Referring first to FIG. 1, there is shown a diskette duplicator 10 having a stack loader 12 attached to the top of the cabinet. An eject slot 14 is located on a cabinet end, and a reject unloader chute 16 opens through the bottom of the cabinet. Reject unloader chute 16 is in alignment with stack loader 12, for purposes to be hereinafter described.

Figure 2:
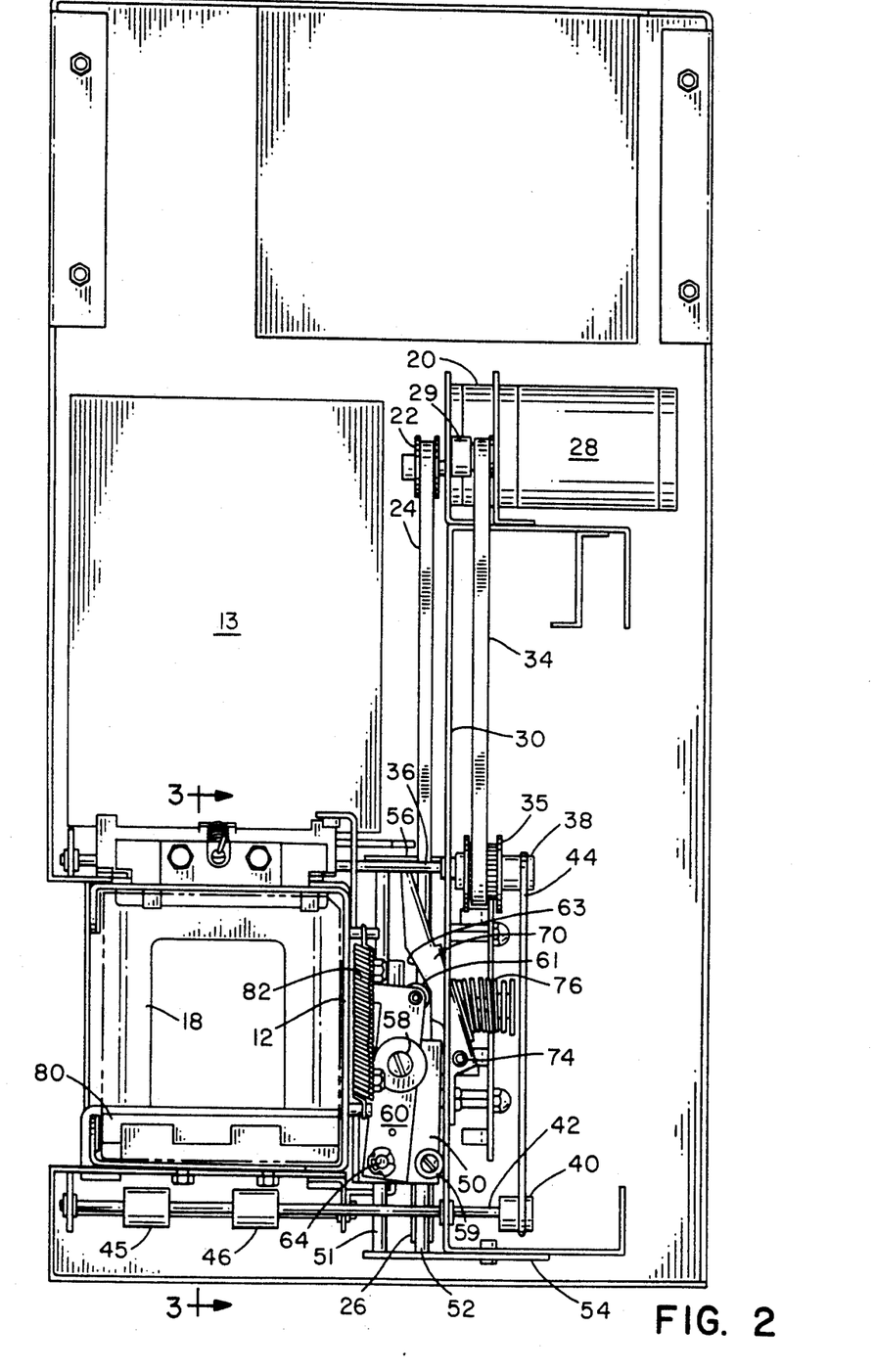
FIG. 2 shows a top view of the invention with the cabinet removed.

FIG. 2 shows a top view of the invention with the cabinet removed. A diskette tray 18 is positioned at the bottom of stack loader 12; diskette tray 18 is aligned adjacent disk drive unit 13, at the elevation of the disk drive entry opening for receiving diskettes. This alignment permits a diskette which is placed on tray 18 to be guided into the disk drive unit for recording, and when the diskette is ejected from the disk drive unit after recording it can be transported away from the system.

The mechanisms which control the transport motions of the diskette are controlled by drive motors 20 and 28. Drive motor 20 is a bi-directional D.C. motor, connected to drive pulley 22, which in turn is coupled to a drive belt 24. Drive belt 24 moves about an idler pulley 26, and a movable carriage 50 is affixed to drive belt 24, so as to move in coincidence with the movement of drive belt 24. Carriage 50 is slidably guided along two rails 51, 52, which rails are affixed at their rear ends to a rear housing plate 54, and at their front ends to a front housing plate 56. Carriage 50 is therefore movable along rails 51, 52 from a rear position proximate rear housing plate 54, to a front position proximate front housing plate 56.

Figure 3:
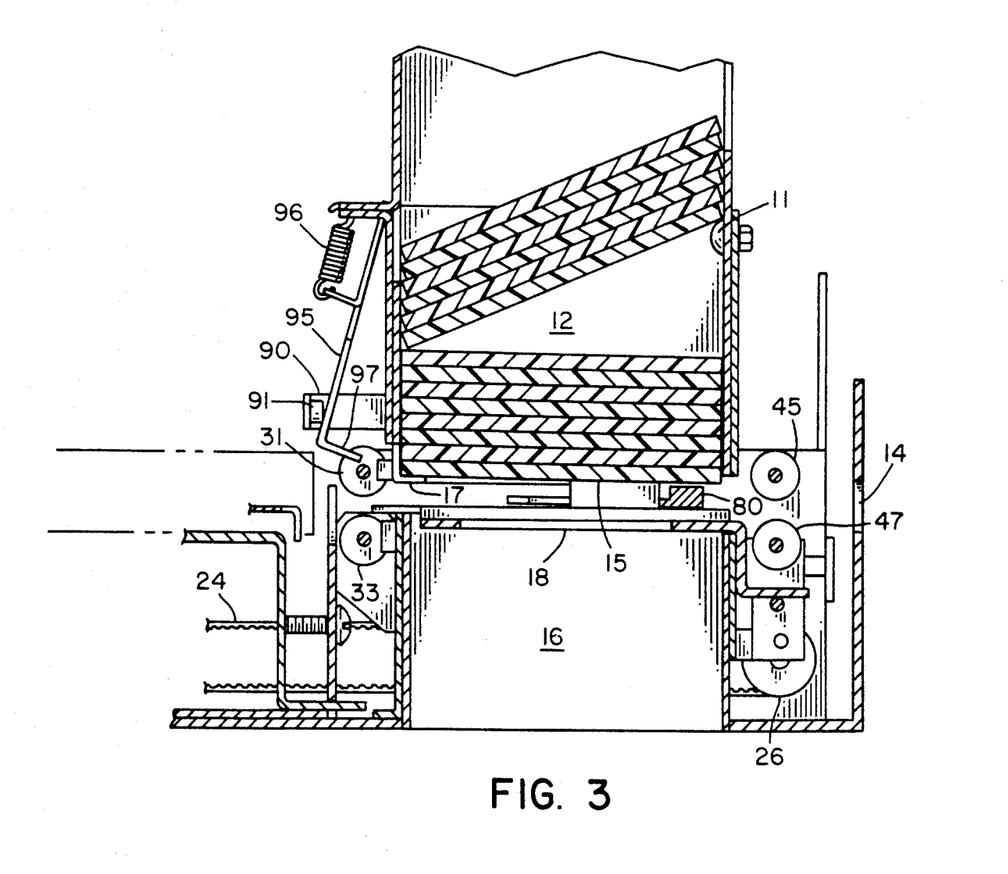
FIG. 3 shows a view taken along the lines 3—3 of FIG. 2.

A cam follower lever 60 is pivotally mounted to carriage 50 about pin 64. Cam follower lever 60 has an arcuate slot (not shown) beneath cap screw 58, to permit limited pivotal motion of cam follower lever 60 about pin 64. A small torsion spring is engaged between pin 64 and cam follower lever 60, so as to spring bias cam follower lever 60 outwardly toward engagement against cam lever 70. Cam follower lever 60 has a rotatable cam follower 61 which follows the inside edge 63 of a pivotable cam lever 70. Cam lever 70 is pivotally connected about a pin 74 which is affixed to the frame 30. Cam lever 70 is spring-biased inwardly toward cam follower lever 60 by a compression spring 76; compression spring 76 is also affixed at one end to frame 30. Therefore, as carriage 50 moves linearly along rails 51, 52, from its rearmost position to its frontmost position, cam follower lever 60 will be pivotally guided by the inside edge 63 of cam lever 70 until a predetermined forward position for carriage 50 is achieved. At a predetermined forward position of carriage 50, a rotatable cam follower 59 located proximate the rear of carriage 50 engages against cam lever 70 and urges it outwardly away from cam follower lever 60, thereby disengaging contact between cam follower 61 and cam lever 70. When this happens, the torsion spring about pin 64 urges cam follower lever 60 to pivot outwardly, away from diskette tray 18. FIG. 2 and FIG. 3 each show carriage 50 in its "home" position, to be hereinafter described.

Motor 28 is connected to a drive pulley 29, which in turn is connected to drive belt 34. Belt 3 is coupled to a driven pulley 35 which rotates a shaft 36. A second drive pulley 38 is affixed to shaft 36, to drive a second belt 44. Belt 44 is coupled to a driven pulley 40 which rotates a shaft 42. Rollers 45, 46 are affixed to shaft 42 and rotate therewith. A pair of free-wheeling rollers 47, 48 are displaced below rollers 45, 46, the displacement distance being slightly less than the thickness of a diskette. The spacing between rollers 45, 47 and rollers 46, 48 is predetermined, so as to permit the grasping and movement of a diskette which comes within the roller spacing distance.

A second pair of rollers 31, 32 is affixed to shaft 36, and rollers 31, 32 are rotatable with shaft 36. A pair of free-wheeling rollers 33, 37 are spaced below rollers 31. 33 by a distance slightly less than the thickness of a diskette, so as to permit a diskette to be grasped between corresponding rollers 31, 33 and rollers 32, 37 whenever the diskette comes within the inter-roller spacing. FIG. 3 shows an illustration of the roller spacing as herein described. It is to be noted that rollers 45, 47 etc., are positioned adjacent ejection slot 14, and thereby will eject a diskette outwardly through ejection slot 14. Rollers 31, 33 etc., are positioned adjacent the entrance of the magnetic disk drive unit 13 and will therefore convey a diskette into the magnetic disk drive opening prior to the recording operation, and will convey a diskette away from disk drive unit 13 after the recording operation.

FIGS. 2 and 3 also illustrate a slidable gate 80 in the "home" position. Gate 80 is slidably movable along the bottom of stack loader 12, and in the "home" position it blocks the bottom opening of stack loader 12 to prevent diskettes in stack loader 12 from falling downwardly onto diskette tray 18. FIG. 2 shows gate 80 in the "home" position without any diskettes in stack loader 12. FIG. 3 shows gate 80 in the same position with a diskette 15 positioned at the bottom of stack loader 12. Gate 80 supports the rear lower edge of diskette 15 and thereby prevents diskette 15 from dropping downwardly onto the surface of diskette tray 18. The front lower edge of diskette 15 is supported by a lip 17 which projects inwardly from the lower edge of stack loader 12.

Figure 7:
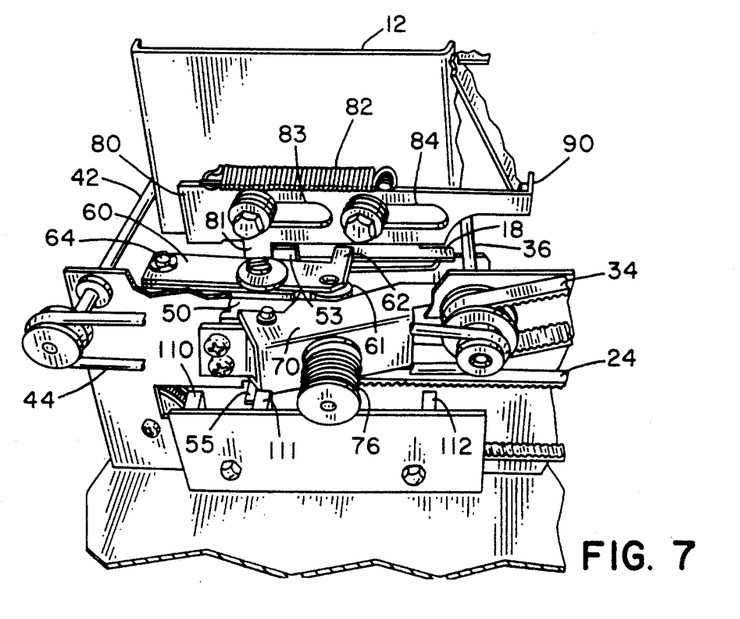
FIG. 7 shows an isometric view of a portion of the invention.

FIG. 7 shows an isometric view of some of the operative mechanisms associated with the invention; portions of the invention are cut away to illustrate important features. Carriage 50 is affixed to belt 24 and is movable therewith, sliding forwardly and rearwardly along its guide rails in coincidence with the rotational drive direction of motor 20. A number of operative elements are attached to carriage 50, and are movable therewith to perform some of the important operational functions of the invention. For example, cam follower lever 60 moves with carriage 50; cam follower lever 60 also pivots in a horizontal plane about pin 64, responding to cam follower 61. The horizontal pivotal motion of cam follower lever 60 permits finger 62 to be horizontally displaced into the path of travel of diskettes, to assist in appropriate diskette transport movements to be hereinafter described. A vertical trip lever 53 is also affixed to carriage 50, and is movable therewith. Trip lever 53 moves horizontally in a vertical plane which is aligned with an arm 81 forming a part of slidable gate 80. The rearward motion of carriage 50 will cause trip lever 53 to engage against arm 81, thereby sliding gate 80 rearwardly. Gate 80 has a rearward range of travel as determined by the length of slots 83 and 84, and the rearward motion of gate 80 is made against the resistance of spring 82. A forwardly extending arm 90 also forms a part of slidable gate 80 and moves in coincidence therewith.

The direction and control of motors 20 and 28 are at least partially determined by the position of carriage 50. The position of carriage 50 is indicated by a flag tab 55 which projects horizontally outwardly from the lower side of carriage 50. Flag tab 50 functions in cooperation with a plurality of opto devices which are positioned at predetermined locations along the path of travel of carriage 50. A typical opto device has a light-emitting source and a photosensitive receiver spaced a short distance from the source. The light beam is broken by any object passing between the source and receiver, and flag tab 55 is positioned in conjunction with these opto devices so that it breaks the various light beams during the course of travel of carriage 50. FIG. 7 shows three opto devices 110, 111 and 112; opto 110 is positioned to correspond with the "pick" position of carriage 50 and slidable gate 80; opto 111 is positioned to correspond with the "home" position of carriage 50; opto 112 is positioned to correspond to the "load" position of carriage 50. Opto 112 also serves to provide an indication of the "eject" position of carriage 50.

FIG. 3 also shows the manner in which diskettes become stacked in stack loader 12. Diskettes may be inserted into the top of stack loader 12 in quantity, but as the stack of diskettes drops downwardly through stack loader 12 the bottom diskette encounters raised obstruction 11 on the inside wall of stack loader 12. Obstruction 11 causes the diskette stack to skew downwardly at the forward end, sliding over the top of obstruction 11, and permitting the bottommost diskette to drop the remainder of the distance to the bottom of the stack loader 12. This process continues until a number of diskettes are evenly stacked upwardly from the bottom of stack loader 12, to a level whereby insufficient clearance exists for the bottommost diskette in the upper portion of the stack can no longer clear obstruction 11. The stacking process then ceases, until a diskette is removed from the bottom of stack loader 12 to thereby permit clearance for the bottommost skewed diskette to drop downwardly. The purpose of this stacking mechanism is to limit the maximum number of diskettes which may collect at the bottom of stack loader 12, to limit the loading effects on slidable gate 80 in subsequent operations.

Figure 4:
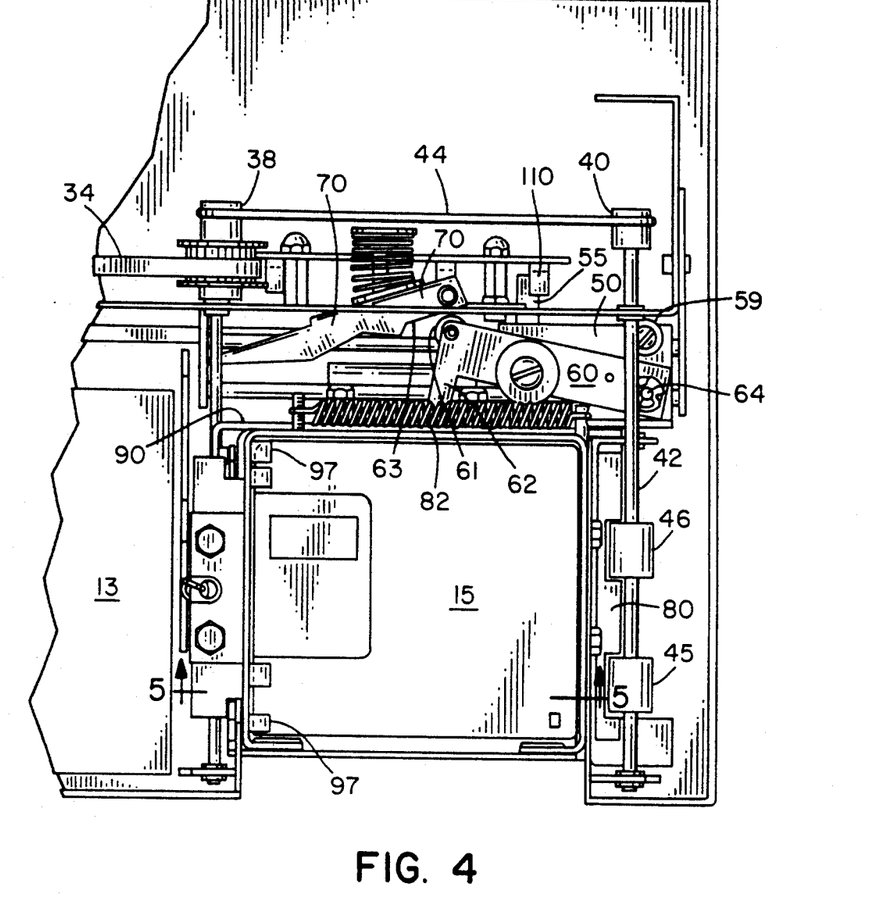
FIG. 4 shows a top view of the invention in a load position.
Figure 5:
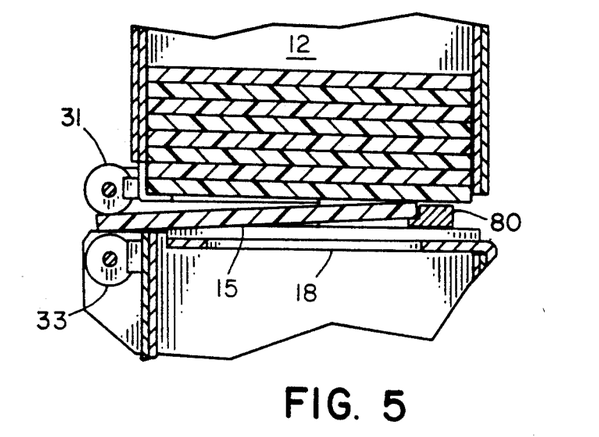
FIG. 5 shows a view taken along the lines 5—5 of FIG. 4.

FIG. 4 shows a top view of the apparatus with the carriage 50 retracted into a "pick" position, which is the rearmost position of carriage 50. The "pick" position of carriage 50 is determined by flag tab 55 breaking the light beam of opto 110, during the rearward movement of carriage 50. In this position, slidable gate 80 is retracted rearwardly away from its blocking position at the bottom of stack loader 12, and lever 95 is pivoted rearwardly to cause tab 97 to push the diskette rearwardly sufficiently far to clear lip 17. Therefore, the diskette 15 is permitted to drop downwardly onto diskette tray 18 and slidable gate 80. FIG. 5 shows a cross-sectional view taken along the lines 5—5 of FIG. 4, illustrating the position of diskette 15 on diskette tray 18 and slidable gate 80. In this position, diskette 15 has its front edge positioned on diskette tray 18 and its rear edge positioned on slidable gate 80. Diskette 15 remains in this relative position during the subsequent forward motion of slidable gate 80, to be hereinafter described. FIGS. 4 and 5 also illustrate diskette 15 in position between rollers 31, 33 and 32, 37, but rearwardly spaced therefrom.

In the "pick" position of carriage 50, cam follower 61 is rearwardly positioned along the inside edge 63 of cam lever 70, and cam follower lever 60 is therefore pivoted outwardly about pin 64. A finger 62 at the forward end of cam follower lever 60 is retracted away from stack loader 12 in the "load" position.

The arm 90 is mechanically connected to slidable gate 80 and it moves therewith; the "home" position of arm 90 is shown in FIG. 3, and the "pick" position of arm 90 is shown in FIG. 4. Arm 90 has a pad 91 which is engageable against lever 95. Lever 95 is pivotally connected to stack loader 12, and spring 96 urges lever 90 to an outward-biased position (FIG. 3). When carriage 50 is moved rearwardly into the "pick" position, arm 90 and pad 91 engage against lever 95, thereby pivoting arm 95 rearwardly against the force of spring 96. The lower end of lever 95 is bent rearwardly along either edge to form tabs 97. Tabs 97 become engageable against the edge of the bottom diskette in the stack loader 12 whenever carriage 50 is in the "pick" position (FIG. 4). Tabs 97 slide the bottom diskette rearwardly to clear lip 17, thereby pushing the diskette in stack loader to permit it to drop downwardly to cause the front edge to fall onto diskette tray 18.

Figure 6:
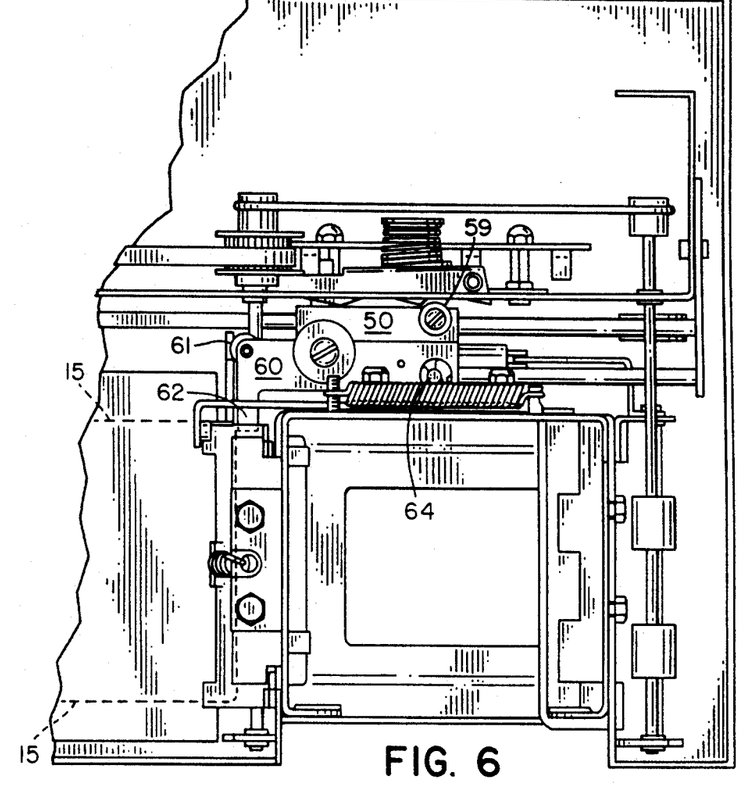
FIG. 6 shows a top view of the invention in feed position.
Figure 8:
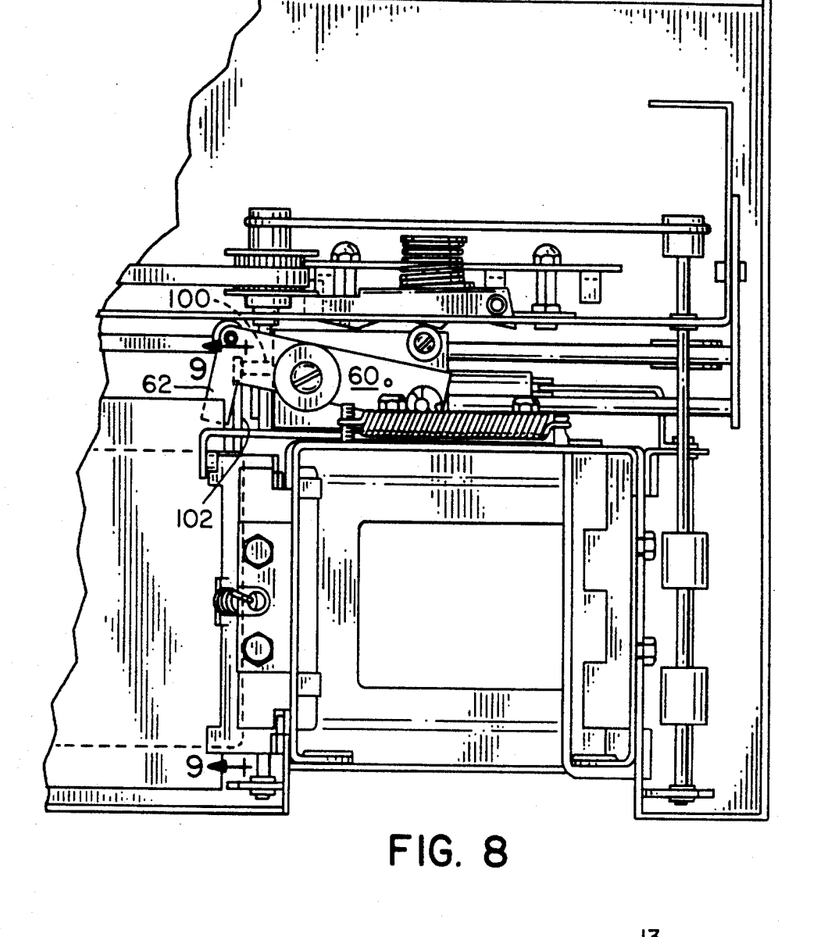
FIG. 8 shows a top view of the invention in eject position.

After a diskette has been loaded as described above, the drive motor 20 reverses direction and begins moving carriage 50 in a forwardly direction. The forward movement of carriage 50 releases the rearward force against slidable gate 80, and slidable gate 80 moves forwardly under the influence of spring 82. Slidable gate 80 abuts against the rear edge of diskette 15, thus moving it forwardly into engagement between rollers 31, 33 and 32, 37. The two pairs of rollers engage the diskette and transport it into the adjacent magnetic drive device at the "load" position of carriage 50. However, the diskette does not fully enter the magnetic drive device, but the rear edge of diskette 15 remains projecting from the magnetic drive device. As carriage 50 moves forwardly, as shown in FIGS. 2 and 6, cam follower 61 follows the inner edge of cam lever 70 and cam follower lever 60 pivots inwardly about pin 64. The finger 62 at the forward end of cam follower lever 60 pivots inwardly into the diskette path of travel behind diskette 15. Near the forward position of carriage 50, finger 62 engages the rear edge of diskette 15 and pushes diskette 15 further into the magnetic drive unit 13, wherein it is received and clamped automatically for a recording operation. Immediately after finger 62 engages against the rear edge of a diskette 15, rotatable cam follower 59 at the rear of carriage 50 engages against the inside edge 63 of cam lever 70. As carriage 50 proceeds forwardly, cam follower 59 causes cam lever 70 to pivot outwardly, thereby disengaging from cam follower 61. The torsion spring about pin 64 on cam follower lever 60 exerts a force tending to pivot cam follower lever 60 in an outwardly direction, away from diskette tray 18. However, finger 62 of cam follower lever 60 is at this point engaged behind the rear edge of a diskette 15, and the force resistance against finger 62 prevents cam follower lever 60 from pivoting outwardly. Carriage 50 therefore moves forwardly toward the magnetic drive unit 13 until the diskette is pushed into magnetic drive unit 13 and clamped. The magnetic drive unit is designed to latch the diskette 15 into position for recording, once finger 62 has moved diskette 15 inwardly to a predetermined position. As soon as the diskette 15 has been pushed into the drive unit, the resistance against finger 62 is removed, and cam follower lever 60 pivots outwardly to a rest position as carriage 50 moves a short distance in the rearward direction, as shown in FIG. 8. In this position, finger 62 is cleared away from the path of travel of diskette 15.

Figure 9:
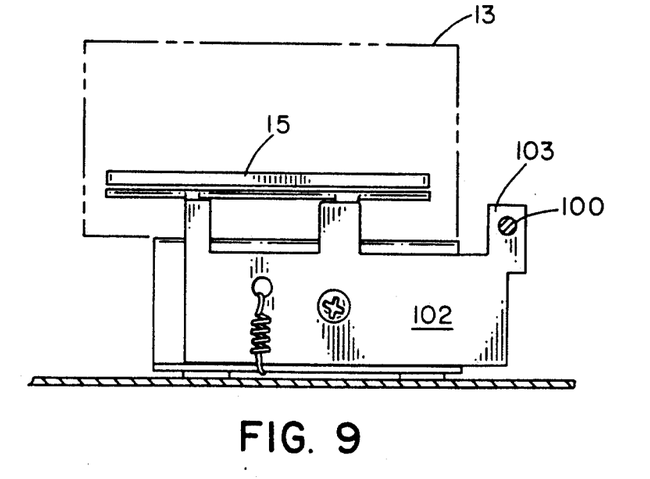
FIG. 9 shows a view taken along the lines 9—9 of FIG. 8.

After the recording operation has been completed, carriage 50 moves forwardly into the position shown in FIG. 8, which is designated the "eject" position. In this position, an eject pin 100 which is affixed to the forward end of carriage 50 engages against the eject mechanism 102 which forms a part of the magnetic drive unit. The eject mechanism of the magnetic drive unit is shown in FIG. 9, which is a cross-sectional view taken along the lines 9—9 of FIG. 8. Eject pin 100 engages a tab 103 which forms a part of the eject arm 102, which in turn is part of the magnetic drive unit. Eject pin 100 forces the eject arm forwardly to cause an ejection of the now recorded diskette 15 from the magnetic drive unit.

The magnetic drive unit pushes the diskette 15 outwardly into engagement between rollers 31, 33 and 32, 37. The rollers transport the diskette rearwardly, either into the reject unloader chute 16 or out through eject slot 14. It should be noted that, at the initiation of the ejection operation, diskette tray 18 is either pivoted upwardly at its forward end, thereby providing a clearance opening for ejecting the diskette into reject unloader chute 16, or is in a horizontal position, thereby permitting the ejected diskette to travel outwardly through slot 14.

Figure 10:
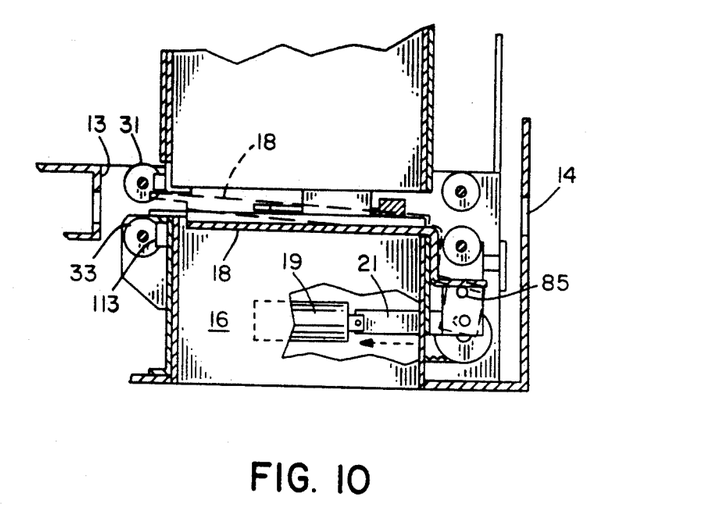
FIG. 10 shows the two positions of the diskette tray.

FIG. 10 shows a diagram of the operation of diskette tray 18. Diskette tray 18 is shown in solid outline in its normal horizontal position, and in dotted outline in its elevated "reject" position. Diskette tray 18 is pivotally mounted about pin 85, and is movable by an electrically-driven solenoid 19. Activation of solenoid 19 causes solenoid arm 21 to pivot diskette tray 18 upwardly. When diskette tray 18 is in its normal horizontal position, diskettes ejected from magnetic drive 13 are conveyed between roller 31, 33 and 32, 37 across diskette tray 18, and are further conveyed between rollers 45, 47 and 46, 48 outwardly through eject slot 14.

Activation of solenoid 19 causes diskette tray 18 to pivot upwardly, thereby causing diskettes ejected from magnetic drive 13 to pass between rollers 31, 33 and 32, 37 into reject unloader chute 16. Diskettes which pass into eject unloader chute 16 may be collected in chute 16, or conveyed into a reject bin or collection point.

Figure 11:
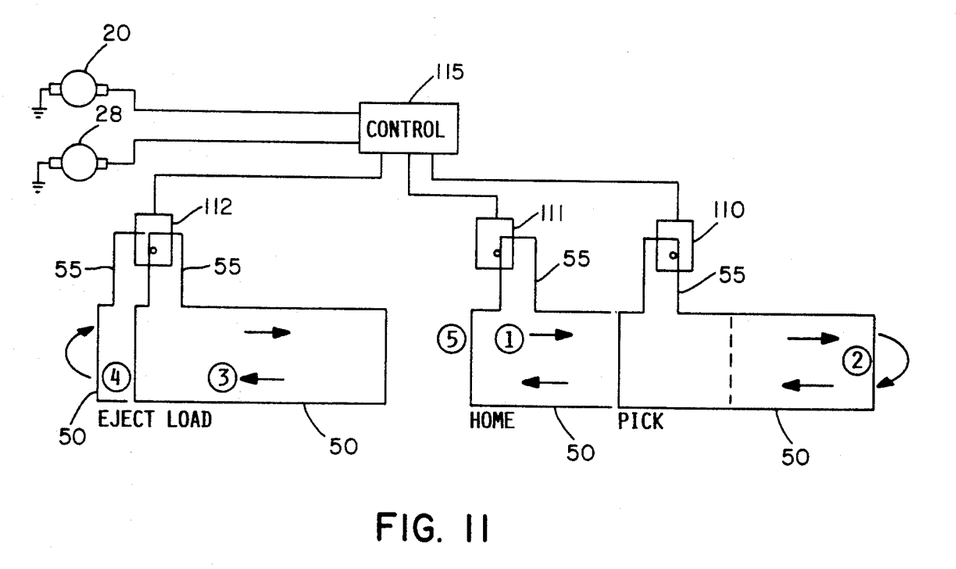
FIG. 11 shows a diagram of several carriage positions, with sensor activation.

FIG. 11 shows diagrammatically the various positions of carriage 50 in relation to opto devices 110, 111 and 112. The three opto devices 110, 111 and 112 are connected into a control circuit 115, which generates the voltage drive signals for motors 20 and 28. The positions of carriage 50 shown in FIG. 11 correspond to the "pick" position (position 2), the "home" position (position 1), the "load" position (position 3), and the "eject" position (position 4). The "home" position (position 1) is established by the rearward motion of carriage 50, and is determined at the point where flag tab 55 clears opto 111 in its rearward motion. At this clearance point, opto 111 generates a signal to control circuit 115, which stops motors 20 and 28 from further operation. Control circuit 115 also receives signals from other circuits not directly related to the present invention, which signals may initiate operations, may provide signal indications that a prerecorded diskette has failed data checking procedures and therefore must be rejected, or other signals.

The operation of the system is initiated by a signal from external the system, causing control circuit 115 to activate motors 20 and 28. Motor 20 begins moving carriage 50 rearwardly, and when carriage 50 reaches the "pick" position the mechanical linkage as described herein places the front edge of the bottom diskette into the diskette tray 18. In this position, flag tab 55 breaks the light beam of opto 110, thereby causing a signal to control circuit 115 to reverse the rotational direction of motor 20 (position 2). Carriage 50 then proceeds in a forwardly direction until flag tab 55 breaks the light beam of opto 112 (position 3). At this point, opto 112 sends a signal to control circuit 115 to momentarily reverse and then stop motor 20, and to stop motor 28. Motor 28 is momentarily reversed in its rotational direction, as a check to ensure that the diskette has been received and clamped into the drive unit. If the diskette is not clamped into the drive unit, rollers 31, 33 will pull the diskette rearwardly, causing the diskette to break the light beam of opto 113. If the diskette has been thoroughly clamped into the drive unit, the light beam of opto 113 will not be broken. Therefore, the system may make this check by waiting a predetermined time after reversing the rotational direction of rollers 31, 33, to determine whether the light beam of opto 113 is broken within this predetermined time; if the light beam is not broken it is assumed that the disk has been clamped in the magnetic drive unit. The system remains in this position until a signal is received from the magnetic drive unit, indicating that the recording operation has been completed. This signal is received by control circuit 115, and causes motor 20 and 28 to be turned on, thereby moving carriage 50 forwardly to the "eject" position (position 4). In this position, flag tab 55 first closes and then opens the light beam of opto 112, which signals control circuit 115. Control circuit 115 then reverses the direction of motor 20, and carriage 50 begins moving rearwardly. Carriage 50 continues its rearward motion until flag tab 55 has passed by opto 111 (position 5), wherein the system ceases operation. If further diskettes are to be transported, the system begins a new operational sequence as herein described.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for transporting diskettes along a diskette travel path from a vertical stack, serially into a magnetic recording unit, and for transporting said diskettes from said magnetic recording unit to a collection point, comprising
   a) a diskette tray positioned adjacent said magnetic recording unit for guiding diskettes during a portion of their transit along the diskette travel path;
   b) a carriage movable along a path of travel adjacent said diskette tray, said carriage having a gate slidable over said diskette tray for pushing diskettes along the diskette travel path from the stack to the recording unit, said carriage having a pivotal cam follower lever with a finger pivotally movable over said diskette tray, said finger pushes diskettes along the diskette travel path subsequent to that of said gate;
   c) a pivotal cam lever positioned adjacent said carriage path of travel, said cam lever having a cam surface engageable against said carriage pivotal cam follower lever, a portion of said cam surface guiding said cam follower lever to pivot said finger over said diskette tray;
   d) a cam roller on said carriage, positioned to engage against said pivotal cam lever at a predetermined point along the path of travel of said carriage, whereby said cam roller causes said cam lever to pivot outwardly away from said carriage, and whereby said pivotal cam follower lever pivots outwardly away form said carriage and said finger pivots outwardly away form said diskette tray;
   e) a plurality of position sensors arranged along said carriage path of travel, and means for sensing the position of said carriage and generating signals therefrom;
   f) first motor drive means connected to said carriage for moving said carriage in either of two directions along said path of travel;
   g) control means, connected to said position sensors and to said first motor drive means, for selectively activating said first motor drive means i response to signals from said position sensors; and
   h) a diskette stack loader positioned above said diskette tray, said stack loader having means for supporting a plurality of diskettes in a vertical stack, including a projecting lip at a bottom edge to support the bottom most diskette in the stack.

2. The apparatus of claim 1, wherein said plurality of position sensors each further comprise an optoelectronic device having a light-emitting source and a spaced apart light-sensitive sensor, and said means for sensing the position of said carriage further comprises a flag tab projecting from said carriage at a position to interrupt the light path between said light-emitting sensor and said light-sensitive sensor at a predetermined position of said carriage along said carriage path of travel.

3. The apparatus of claim 1, wherein said carriage gate further comprises a bar having a raised lip projecting above said diskette tray.

4. The apparatus of claim 1, further comprising a diskette ejection slot positioned adjacent an end of said diskette tray opposite said magnetic recording unit.

5. The apparatus of claim 4, further comprising at least a first pair of pinch rollers positioned between said diskette tray and said magnetic recording unit, and at least a second pair of pinch rollers positioned between said diskette tray and said ejection slot, and second motor drive means connected to said first and second pairs.

6. The apparatus of claim 5, wherein said control means is further connected to said second motor drive means, for selectively activating said second motor drive means in response to signals from said position sensors.

7. The apparatus of claim 1, wherein said pivotal cam lever is spring-biased toward said carriage and said pivotal cam follower lever is spring-biased toward said cam lever.

8. The apparatus of claim 7, further comprising a diskette picking lever pivotally attached to said diskette stack loader, said lever having an inward tab aligned to contact an edge of the lowermost diskette in said diskette stack loader.

9. The apparatus of claim 8, further comprising an arm affixed to said carriage and aligned to contact said diskette picking lever at a predetermined position of said carriage, whereby said arm moves said diskette picking lever toward said diskette stack loader, and said inward tab slides the lowermost diskette in said stack loader rearwardly.

10. The apparatus of claim 9, wherein said diskette stack loader further comprises a raised interior obstruction, whereby the number of diskettes in said diskette stack is limited to a predetermined number of vertically-stacked diskettes.

11. The apparatus of claim 1, further comprising a first position sensor located at a first position along said carriage path of travel, said first position corresponding to a location where said gate is rearward of said diskette stack loader.

12. The apparatus of claim 11, further comprising a second position sensor located at a second position along said carriage path of travel, said second position corresponding to a location where said gate is beneath said diskette stack loader.

13. The apparatus of claim 12, further comprising a third position sensor located at a third position along said carriage path of travel, said third position corresponding to a location where a diskette has been inserted into said magnetic recording unit.

* * * * *